United States Patent [19]

Hovens et al.

[11] 4,224,640
[45] Sep. 23, 1980

[54] CRT BEAM CURRENT CONTROL APPARATUS

[75] Inventors: Paulus J. M. Hovens; Miloslav Tryzna; Wouter Smeulers; Willem H. Amsen, all of Eindhoven, Netherlands

[73] Assignee: U.S. Philips Corporation, New York, N.Y.

[21] Appl. No.: 972,590

[22] Filed: Dec. 22, 1978

[30] Foreign Application Priority Data

Jan. 25, 1978 [NL] Netherlands .................. 7800870

[51] Int. Cl.² ............................................. H04N 5/68
[52] U.S. Cl. .................................. 358/242; 358/243; 358/74
[58] Field of Search ............... 358/74, 39, 242, 243, 358/168

[56] References Cited

U.S. PATENT DOCUMENTS 3,598,913  8/1971  Janssen ........................... 358/243 X Primary Examiner—Robert L. Richardson
Attorney, Agent, or Firm—Thomas A. Briody; William J. Streeter; Edward W. Goodman

[57] ABSTRACT

In a television picture display device wherein a cathode of a picture display tube is driven by an emitter-follower and a control signal for a beam current reference level control circuit is obtained from the collector circuit of this emitter-follower, measures are taken to compensate for leakage currents from and to the cathode. To this end a blacker-than-black current compensation circuit is provided while furthermore it is ensured that the blacker-than-black curent can be processed by the beam current reference level control circuit.

6 Claims, 2 Drawing Figures

CRT BEAM CURRENT CONTROL APPARATUS

BACKGROUND OF THE INVENTION

The invention relates to a television picture display device having a picture display tube, a cathode of which is driveable by an emitter-follower, the collector of this emitter-follower being coupled to an input of a beam current reference level control circuit.

Dutch Patent Application No. 7604463 discloses a television picture display device of the above-defined type. In this device a control of the black level, serving as the reference level, of the beam current, to a constant value takes inter alia place by means of a voltage produced across the collector resistor of the emitter-follower. Although in principle this control should furnish a very constant black level this appears not to be the case.

SUMMARY OF THE INVENTION

It is an object of the invention to improve the constancy of the controlled reference level of the beam current.

A television picture display device of the above-defined type according to the invention is therefore characterized in that the beam current reference level control circuit comprises a blacker-than-black current compensation circuit by which the influence of the blacker-than-black current on the beam current reference level control circuit is compensated for while a blacker-than-black current conductive circuit is coupled to the cathode of the picture display tube so that the beam current reference level control circuit can also process a blacker-than-black current of the picture display tube occurring in case of a blanked beam current.

It should be noted that the use of a blacker-than-black current compensation circuit in a beam current reference level control circuit is known per se from the Dutch Patent Application No. 6903362. In that case, however, the picture display tube is controlled via the wehnelt electrode. When picture display devices to which the invention relates are controlled via the cathode, a blacker-than-black current compensation appears to be impossible without further measures. Applicants found, namely, that the cathode current of the picture display tube, in the case of a blanked beam current, may have a direction which may cut off the emitter-follower so that no measuring data about the collector resistance of the emitter-follower become available, and a blacker-than-black current compensation is not possible. By coupling a blacker-than-black current conduction circuit to the cathode of the picture display tube in such a manner that also the blacker-than-black current, occurring with a blanked beam current, can be processed by the beam current reference level control circuit, a blacker-than-black current compensation is possible. The blacker-than-black current conduction circuit may be a circuit supplying a constant direct current to the cathode of the picture display tube which ensures that the emitter-follower cannot be cut off if the picture display tube, in the case of a suppressed beam current, carries a cathode current which might cut off the emitter-follower, or a circuit which can take over the blacker-than-black current from the emitter-follower and pass it on to the beam current reference level control circuit.

DESCRIPTION OF THE DRAWINGS

The invention will now be further explained with reference to the drawing.

In the drawing

DESCRIPTION OF THE PREFERRED EMBODIMENT

Figure 1:
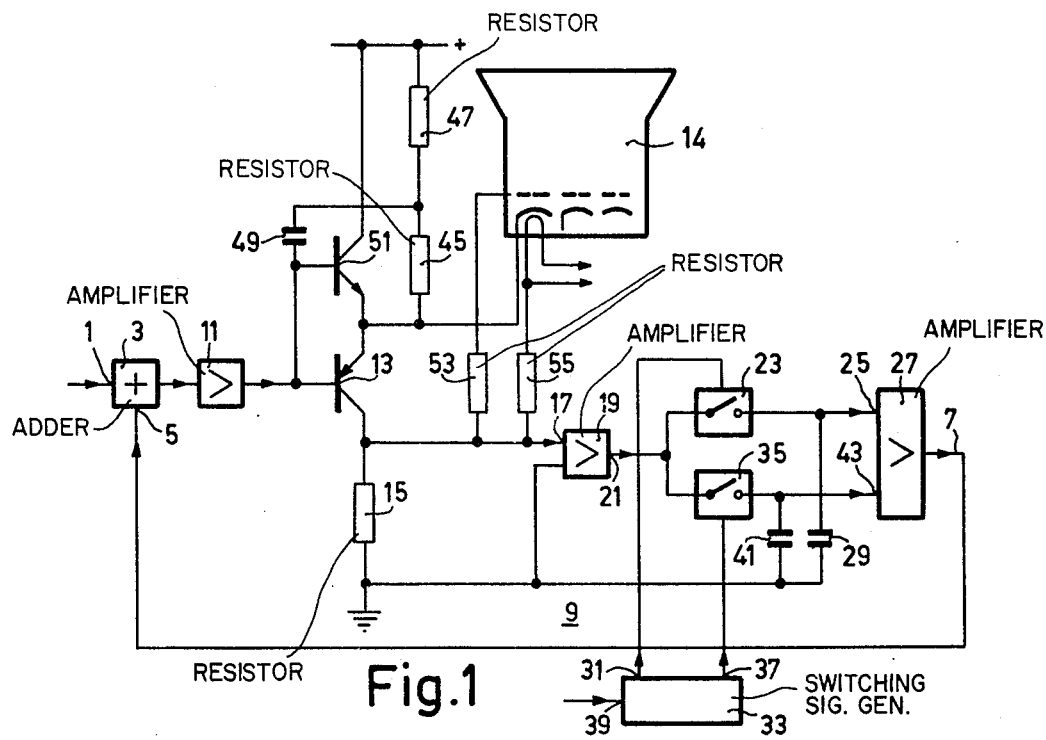
FIG. 1 shows a circuit of a picture display device according to the invention in which the emitter-follower can be kept conductive by means of a direct current and FIG. 2 shows a further circuit of a picture display device according to the invention in which the emitter-follower current can be taken over by another circuit and passed to a control circuit.

In FIG. 1 a video signal is applied to an input of an adder circuit 3. A control signal originating from an output 7 of a beam current reference level control circuit 9 appears at a further input 5 of the adder circuit 3. This control signal is added to the video signal and the sum signal is applied to the base of an emitter-follower 13 via an amplifier 11.

The emitter of the emitter-follower 13 drives a cathode of a picture display tube 14. The collector circuit of the emitter-follower 13 comprises a resistor 15, an end of which is connected to an input 17 of the beam current reference level control circuit 9. The beam current supplied by the emitter-follower 13 flows through this resistor 15.

The input 17 is, at the same time, the input of an amplifier 19, an output 21 of which is connected to an input 25 of an amplifier 27 via a switch 23. A capacitor 29 is also connected to the input 25. The switch 23 closes periodically under the influence of a signal derived from an output 31 of a switching signal generator 33 during the occurrence of the reference level, for example the black level, in the video signal.

Consequently a voltage, which is a measure of the cathode current of the picture display tube 14 during the occurrence of the reference level, is produced across the capacitor 29. This cathode current is composed of a beam current and a leakage current. To compensate for the influence of this leakage current, a switch 35, which is also connected to the output 21 of the amplifier 19, is periodically closed during the occurrence of a blacker-than-black level in the video signal, under the influence of a signal originating from an output 37 of the switching signal generator 33.

The switching signal generator 33 is synchronized with the video signal by a synchronisation signal, applied to an input 39 thereof, obtained from the video signal.

A capacitor 41, connected to the output of the switch 35, now has a voltage there across which is a measure of the leakage current of the cathode of the picture display tube 14. This voltage is supplied to an input 43 of the amplifier 27. The amplifier 27 amplifies the difference of the voltages across the capacitors 29 and 41 so that a control signal is produced at the output 7 thereof which is a measure of the beam current of the picture display tube during the occurrence of the reference level in the video signal. This control signal counteracts changes in the beam current reference level which corresponds to the video signal reference level.

The leakage current of the picture display tube 14 may sometimes be directed towards the cathode of that tube. In that case the emitter-follower 13 would be cut off and the leakage current could not be measured in the above described manner. Therefore a direct current is supplied to the emitter-follower 13 via two resistors 45, 47, which are connected to a positive supply voltage which may be in the order of approximately 40 μA. This direct current keeps the emitter-follower 13 in the conducting state thereof.

To enable also a compensation of this direct current in the the blacker-than-black compensation circuit, constituted by the switch 35, the capacitor 41 and the difference formation in the amplifier 27, the value of this direct current must not be dependent on the video signal. Therefore this video signal is applied, via a capacitor 49, to the junction of the resistors 45, 47 so that the voltage across the resistor 45 becomes independent of the video signal.

A second emitter-follower 51, which is also driven by a video signal, is also connected to the cathode of the picture display tube 14. The function of this second emitter-follower 51 is to enable a sufficiently rapid change of the charge of the cathode capacitance in the case of positive-going voltage transients in the video signal. This second emitter-follower plays no part in the measurements of the beam current reference value because the measurements are performed in periods in which the level in the video signal is constant for some time.

The variation in the leakage current in the cathode circuit of the picture display tube 14 can be many times larger than that in the beam current, which condition occurs if the reference level in the video signal is present. The variation in the voltage difference across the capacitors 28 and 41 would then be many times smaller than the variation in the voltage across one of the capacitors 28, 41. This might adversely affect the accuracy of the control system. To prevent this, two resistors 53 and 55 are provided which pass the leakage current from the wehnelt circuit and the heater circuit to the resistor 15 and, consequently, compensate the cathode leakage current to a large extent.

It will be obvious that the direct current supplied to the cathode of the picture display tube may be obtained, if so desired, by means of a transistor connected as a current source. This transistor should then be suitable for a rather high voltage because the voltage at the cathode of the picture display tube may change very much.

Figure 2:
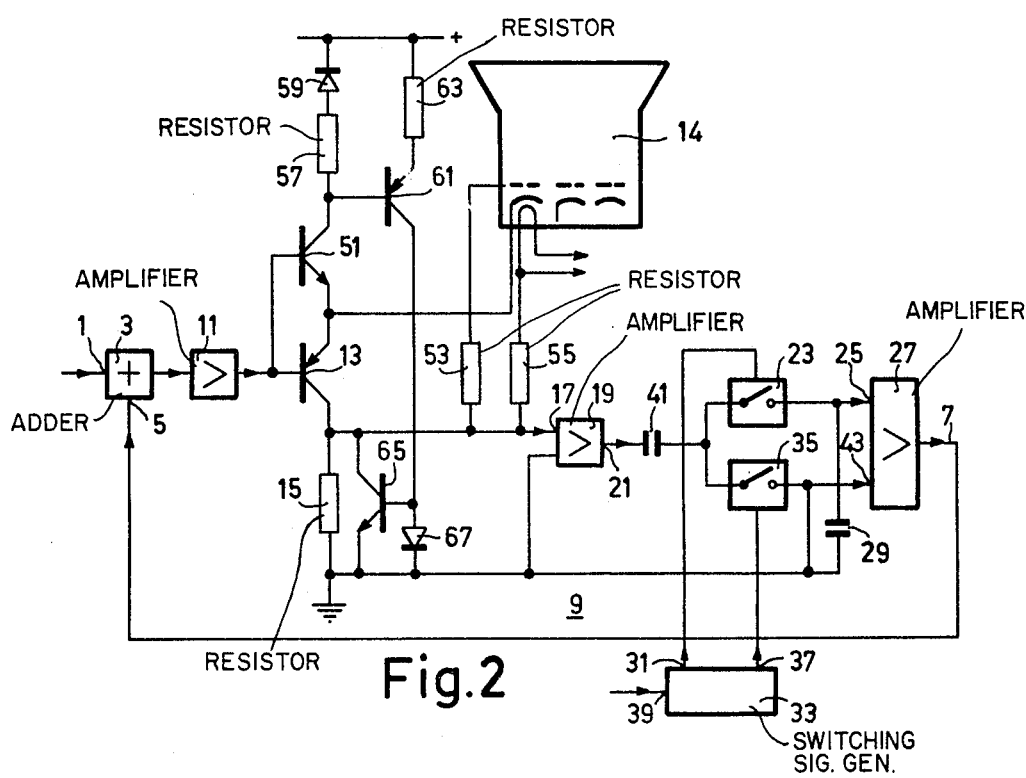

In FIG. 2 elements corresponding to elements of the circuit of FIG. 1 have been given the same reference numerals as in FIG. 1.

The blacker-than-black current compensation circuit of FIG. 2 is arranged somewhat differently then in FIG. 1. The capacitor 41 is now arranged in series with the output 21 of the amplifier 19 and the two switches 23 and 35, and the input 43 of the amplifier 27 is connected to ground. The switch 35 now operates as a clamping switch which ensures that the blacker-than-black level is connected to ground and the voltage across the capacitor 29 becomes a measure of the beam current occurring at the reference level in the video signal.

A further difference relative to the circuit of FIG. 1 is that the collector circuit of the second emitter-follower 51 includes a circuit which acts as blacker-than-black current conduction circuit and supplies any current flowing to the cathode to the input 17 of the beam current reference level control circuit 9 so that also these currents can be measured. The direct current supply circuit (45, 47) at the cathode of the picture display tube can then be dispensed with.

The collector current of the second emitter-follower 51 is supplied to the resistor 15 via two current mirror circuits. A first current mirror circuit is constituted by a series arrangement of a resistor 57 and a diode 59 in parallel with the series arrangement of the base-emitter path of a transistor 61 and a resistor 63 to a positive supply voltage. The collector current of the transistor 61 is supplied to a second current mirror circuit having a transistor 65 and a diode 67, which is in parallel with the base-emitter path of the transistor 65. The collector of the transistor 61 is connected to the resistor 15 through which the difference in the collector currents of the two emitter-followers 13, 51 now flows. Independent of the direction of the cathode currents of the picture display tube 14, a voltage, which is a measure of that cathode current, is now produced across the resistor 15.

Instead of determining the difference current by means of current mirror circuits in the described manner, it is alternatively possible, if so desired, to use other difference-determining circuits.

If so desired also the measuring data for a beam current limiting control of the resistor 15 can be obtained in the described circuits.

The amplifier 19 may comprise a circuit which limits the amplitude of the video signal outside the instants in which measuring takes place. This may be a circuit operated by an auxiliary signal or a self-switching circuit, for example a diode limiter circuit.

If the picture display tube is a color display tube having several electron guns, the emitter-followers for each of the guns may have the resistor 15 in common and a sequential measurement may take place at a reference level sequentially occurring in the different video signals, so that only a portion of the control circuits is not common.

It will be obvious that the choice of the measuring instants and the associated occurrence of the reference levels and blacker-than-black levels are not important for the essence of the invention and may be chosen in a suitable manner.

The blacker-than-black current compensation circuits 9 of the above-described embodiments are interchangeable.

The amplifier 27 may comprise a level reference circuit so that the value of the beam current is determined which is associated with the corresponding reference level in the video signal.

What is claimed is:

1. A television picture display device for displaying pictures derived from video signals, said display device comprising a picture display tube having a cathode; an emitter-follower device coupled to said cathode for producing a beam current for driving said picture display tube; a beam current reference level control circuit coupled to said emitter-follower device for controlling the black level of the beam current; a blacker-than-black current compensation circuit incorporated in said beam current reference level control circuit for compensating for a leakage current in said cathode caused by a blacker-than-black level in the video signal; and a blacker-than-black current conduction circuit coupled to said cathode to enable compensation of said leakage current when said beam current is blanked.

2. A television picture display device as claimed in claim 1, wherein the blacker-than-black current conduction circuit comprises a direct current source coupled to the cathode of the picture display tube for keeping said emitter-follower device conductive at the occurrence of a blacker-than-black current in the cathode circuit of the picture display tube thereby allowing for the compensation of said blacker-than-black signal.

3. A television picture display device as claimed in claim 2, wherein the direct current source comprises a first and second resistor serially connected to a supply voltage said first resistor being a.c. coupled to the base of the emitter-follower device.

4. A television picture display device as claimed in claim 1, which further comprises a second emitter-follower device, of an opposite conduction type as said first-mentioned emitter-follower device, also coupled to said picture display tube cathode, and wherein said blacker-than-black current conduction circuit comprises a difference-forming circuit, coupled to the collector of the second emitter-follower device and coupled to an input of said beam current reference level control circuit.

5. A television picture display device as claimed in claim 4, wherein said difference-forming circuit comprises a current mirror circuit having an input and an output, the input of which is coupled to the collector of the second emitter-follower device and the output to the collector of the first-mentioned emitter-follower device.

6. A television picture display device as claimed in claims 2, 3, 4, 5 or 1, which further comprises a heater, a wehnelt electrode connection of the picture display tube and a leakage current conducting circuit, said heater and said wehnelt electrode connection being coupled to the collector of the first-mentioned emitter-follower device through a said leakage current conducting circuit.

* * * * *

UNITED STATES PATENT OFFICE
CERTIFICATE OF CORRECTION

Patent No. 4,224,640　　　　　　　　　Dated September 23, 1980

Inventor(s) Paulus J. M. Hovens et al

It is certified that error appears in the above-identified patent and that said Letters Patent are hereby corrected as shown below:

On the Title page, under item [54], change the Title to read --BEAM CURRENT CONTROL APPARATUS--

Signed and Sealed this

Twenty-ninth Day of September 1981

[SEAL]

Attest:

GERALD J. MOSSINGHOFF

Attesting Officer　　Commissioner of Patents and Trademarks